(12) United States Patent
Mathur et al.

(10) Patent No.: US 7,971,082 B2
(45) Date of Patent: Jun. 28, 2011

(54) METHOD AND SYSTEM FOR ESTIMATING POWER CONSUMPTION OF INTEGRATED CIRCUIT DESIGN

(75) Inventors: Ashish Mathur, New Delhi (IN); Vijay Bhargava, Gurgaon (IN)

(73) Assignee: Freescale Semiconductor, Inc., Austin, TX (US)

( * ) Notice: Subject to any disclaimer, the term of this patent is extended or adjusted under 35 U.S.C. 154(b) by 814 days.

(21) Appl. No.: 12/013,478

(22) Filed: Jan. 14, 2008

(65) Prior Publication Data

US 2008/0184049 A1   Jul. 31, 2008

(30) Foreign Application Priority Data

Jan. 31, 2007   (IN) .............................. 192/DEL/2007

(51) Int. Cl.
*G06F 1/32*   (2006.01)
(52) U.S. Cl. ........................................ 713/320; 713/300
(58) Field of Classification Search .................. None
See application file for complete search history.

(56) References Cited

U.S. PATENT DOCUMENTS

| | | | |
|---|---|---|---|
| 6,735,744 B2 | 5/2004 | Raghunathan et al. | |
| 6,865,526 B1 | 3/2005 | Henkel et al. | |
| 7,343,276 B1* | 3/2008 | Tsukamoto et al. | 703/18 |
| 7,580,824 B1* | 8/2009 | Lewis et al. | 703/14 |
| 2009/0164763 A1* | 6/2009 | Sperber et al. | 712/225 |

* cited by examiner

*Primary Examiner* — Dennis M Butler
(74) *Attorney, Agent, or Firm* — Charles Bergere (57) ABSTRACT

A method and system for estimating power consumption for at least one Intellectual Property (IP) block in an integrated circuit (IC) design includes identifying at least one port in the at least one IP block. The at least one port is associated with at least one operation. A sequence of micro-operations of the at least one operation is identified. The sequence of micro-operations constitutes an operation pipeline. A set of micro-operations per cycle in the operation pipeline and energy per cycle of each cycle of the operation pipeline, based on the set of micro-operations per cycle by using one or more of, an idle energy value, a micro-operation isolated energy (MIE) value, an overlap energy (OE) value, and a micro-operation overlap energy (MOE) value, are determined. Then the power consumption of the at least one IP block is determined using the energy per cycle of each cycle of the operation pipeline.

20 Claims, 4 Drawing Sheets

METHOD AND SYSTEM FOR ESTIMATING POWER CONSUMPTION OF INTEGRATED CIRCUIT DESIGN

BACKGROUND OF THE INVENTION

The present invention relates generally to an Integrated Circuit (IC) design, and in particular, to a method and system for estimating the power consumption of the IC.

In recent years, power has become a key design metric for System-on-Chip (SOC) designs implemented in deep submicron (DSM) technologies. There are several known methods for estimating the power consumption of SOCs. Accurate power estimation is essential for minimizing the power consumption of a circuit. Power estimation is also needed for various functions, such as in the process of designing a robust power grid. Moreover, accurate power estimation of parameterized reusable circuits (also known as cores or intellectual property (IP) cores) is required at the early stages of the analyses, to analyze power versus performance trade offs among the different components.

Commonly used power estimation methodologies include both analytical and simulation methods. In the analytical method, the power consumption of the circuit is estimated from switching at different circuit nodes and the capacitances associated with those nodes. However, for this method, detailed knowledge of the internal implementation of the circuit is required in order to obtain capacitances of circuit nodes. Moreover, the method has practical application only to circuits with a very regular structure, such as memory arrays. In the simulation method, a power model of the circuit is constructed from circuit simulations, the functions of which include switching activity, circuit state and the input vectors applied to the circuit. However, with an increase in the number of inputs and the complexity of today's circuits, the complexity of the process of creating such power macro models has increased exponentially. Although clustering can be used to reduce the complexity of power macro models, clustering is practical only for small circuit structures. Further, these techniques require substantial computation and storage resources.

An exceptionally high level of integration is possible in SOCs these days. However, due to the large size of the circuit and the computational complexity of the power estimation process, power estimation of real-world applications and workloads is not feasible at the gate-level or lower levels of abstraction. Previous work on instruction-based system-level power evaluation of SOC peripheral cores is based on power characterization of instructions or operations executed by the block. However, these prior art methods are applicable only to estimate average power of the blocks and cannot be used for cycle accurate power consumption of a block. Further, these methods do not provide a clear methodology for modeling power consumption of multiple overlapping operations, which is very common on complex blocks. It would be advantageous to be able to accurately estimate the power consumption of a circuit design without the need for excessive computational power and memory.

BRIEF DESCRIPTION OF THE DRAWINGS

The following detailed description of the preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

The detailed description, in connection with the appended drawings, is intended as a description of the presently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a method for estimating the power consumption for at least one Intellectual Property (IP) block in an integrated circuit (IC) design. The power consumption estimation method includes identifying at least one port in the at least one IP block. The at least one port is associated with at least one operation. Further, the method includes identifying a sequence of micro-operations for the at least one operation and identifying a set of micro-operations per cycle. The set of micro-operations constitute an operation pipeline. An energy per cycle for each cycle of the operation pipeline is determined based on the set of micro-operations per cycle, using one or more of an idle energy value, a micro-operation isolated energy (MIE) value, an overlap energy value (OE), and a micro-operation overlap energy (MOE) value. The power consumption of the at least one IP block is then determined using the energy per cycle for each cycle of the operation pipeline.

In another embodiment, the present invention provides a system for estimating the power consumption for at least one IP block in an IC design. The power consumption estimation system includes a port identification module, a micro-operation sequence identifier module, a micro-operation cycle identifier module, an energy-calculator module, and an operation power calculator module. The port identification module identifies at least one port in the at least one IP block. The at least one port is associated with at least one operation. The micro-operation sequence identifier module, in communication with the port identification module, identifies a sequence of micro-operations of the at least one operation. The sequence of micro-operations constitutes the operation pipeline. The micro-operation cycle identifier module, in communication with the micro-operation sequence identifier module, identifies a set of micro-operations per cycle. The set of micro-operations constitute an operation pipeline. The energy-calculator module, in communication with the micro-operation cycle identifier module, determines an energy per cycle for each cycle of the operation pipeline based on the set of micro-operations per cycle, using one or more of an idle energy value, a micro-operation isolated energy (MIE) value, an overlap energy (OE) value, and a micro-operation overlap energy (MOE) value. The operation power calculator module, in communication with the energy-calculator module, determines power consumption of the operation pipeline using the energy per cycle for each cycle of the operation pipeline.

Various embodiments of the present invention provide a method and system for estimating power consumption for at least one IP block in an IC design. The estimation of the power consumption is based on the functional operations performed by the at least one IP block. The energy consumption of each operation pipeline can be based on variations of data and control signal toggling. The estimation of energy consumption is dependent on whether an operation pipeline overlaps another operation pipeline. However, estimating the energy consumption of each cycle of an operation pipeline enables an accurate calculation of the power consumption of the at least one IP block. Further, different energy values are stored in predefined tables before calculating the energy consumption. When the energy values are characterized for storage in predefined tables, a number of reduction steps are applied, which helps to reduce the complexity of creation of the predefined tables and estimating the energy consumption, while maintaining the desired level of accuracy.

Figure 1:
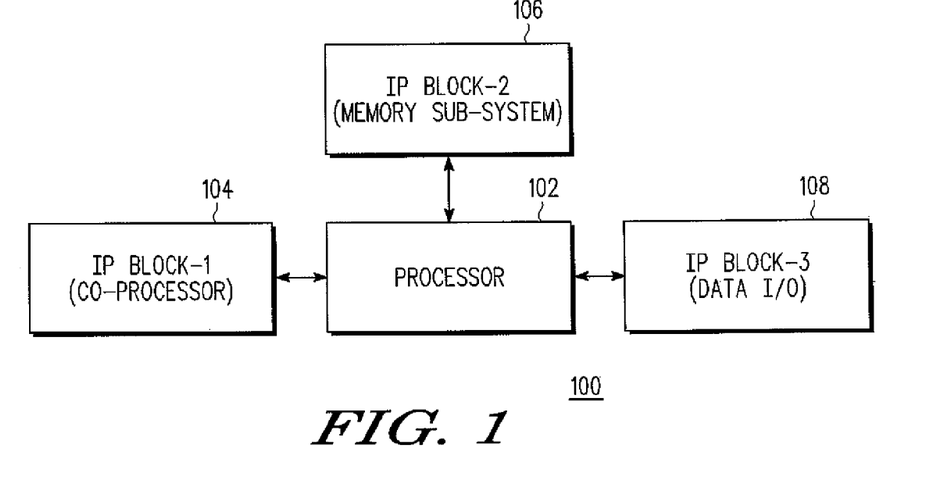
FIG. 1 is a schematic block diagram of a System-on-Chip (SOC), in accordance with an embodiment of the present invention.

Referring now to FIG. 1, a schematic block diagram of a system-on-chip (SOC) 100 is shown, in accordance with an embodiment of the present invention. The SOC 100 includes a processor 102, a first intellectual property (IP) block 104, a second IP block 106 and a third IP block 108. In embodiment, the first IP block 104 is a co-processor, the second IP block 106 is a memory sub-system, and the third IP block 108 is a data input-output block. The first, second and third IP blocks 104, 106 and 108 are connected to the processor 102. The processor 102 can receive instructions, process the instructions and provide a desired output. The first IP block 104 performs a specialized task to reduce the load on the processor 102. The second IP block 106 is a memory sub-system and provides additional memory to the processor 102 to store instructions and data. The third IP block 108 controls the transfer of information between a main memory of the processor 102 and the external components to which the processor 102 is connected, for example, the first, second and third IP blocks 104, 106 and 108. It should be apparent to those skilled in the art that the SOC 100 can include one or more of the IP blocks 104, 106 and 108. Further, it should be apparent to those skilled in the art that other blocks apart from those shown may be present in the SOC 100.

Figure 2:
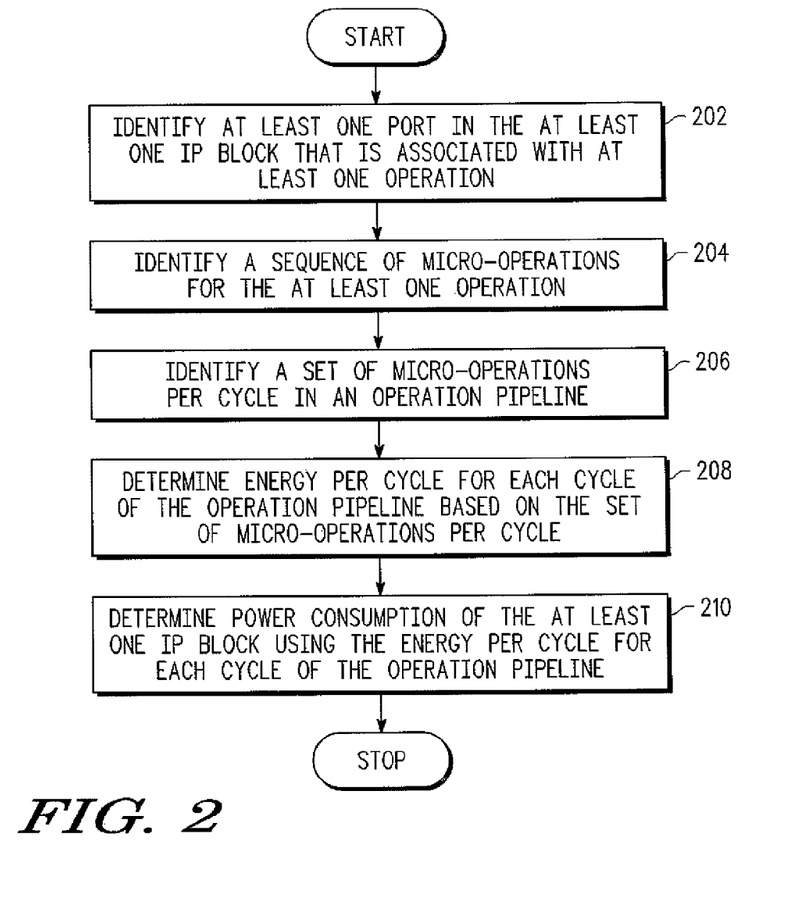
FIG. 2 illustrates a flow diagram depicting a method for estimating the power consumption for at least one IP block in an integrated circuit (IC) design, in accordance with an embodiment of the present invention.

FIG. 2 illustrates a flow diagram depicting a method for estimating the power consumption for at least one IP block in an IC design, in accordance with an embodiment of the present invention. The at least one IP block can be, for example, the second IP block 106. In one embodiment, the power consumption of the second IP block 106 is estimated. The second IP block 106 can be configured to execute transactions or operations, based on the inputs provided to it. The inputs are sent to the second IP block 106 via ports. After executing the operations, the output of the second IP block 106 is obtained at the different ports allocated to receive inputs and provide outputs. In another embodiment, the same ports can be used to receive inputs and provide outputs. In one embodiment, the power consumption is estimated by determining the energy per cycle for each cycle of an operation pipeline of the second IP block 106. The energy per cycle is determined by identifying a set of micro-operations per cycle in an operation pipeline.

At step 202, at least one port is identified in the second IP block 106, which is associated with at least one operation. In one embodiment, one or more input/output ports of the second IP block 106 are identified using the technical specifications of the IC design. The technical specifications provide block diagrams and interface specifications of the second IP block 106. Further, the technical specifications can also be used to identify the operations that can be received at, and executed from, each port. A set of ports 'P', present in the second IP block 106, can be denoted as $\{P_1, P_2, \ldots, P_n, \ldots, P_N\}$. Each port $P_n$ of the set 'P' can include a group of control and data signals required by the operations the port is designed to support. The power consumption of the second IP block 106 is calculated based on operations or transactions received at one or more identified ports.

At step 204, a sequence of micro-operations of the at least one operation is identified. The sequence of micro-operations constitutes an operation pipeline. The second IP block 106 can perform a set of operations 'O', wherein the operations are denoted as $\{O_1, O_2, \ldots, O_k, \ldots, O_K\}$. Each operation $O_k$ of set 'O' can include a sequence of micro-operations. The sequence of micro-operations forms an operation pipeline with stages $S_k$, where the stages are denoted as $\{S_{k1}, S_{k2}, \ldots, S_{k3}, \ldots, S_{kI}\}$. An ith stage $S_{ki}$ of the operation $O_k$ can execute in the ith cycle relative to the start of operation $O_k$. The sequence of micro-operations is executed in successive cycles of the operation pipeline. At step 206, a set of micro-operations per cycle is identified based on the possible overlap of operation pipelines of concurrently executing operations on the second IP block 106.

At step 208, energy per cycle is determined for each cycle, based on the set of micro-operations per cycle, using an idle energy value, a micro-operation isolated energy (MIE) value, an overlap energy (OE) value, and/or a micro-operation overlap energy (MOE) value. The idle energy value is the base energy consumption of the second IP block 106, and typically includes the clock network power and leakage power components of the second IP block 106. The MIE value is the energy consumption of a single micro-operation of an operation pipeline, wherein the single micro-operation is being executed on a specific port. The OE value is the energy consumption of the set of micro-operations for different operations executed on multiple ports in the same cycle. The MOE value is the energy consumption of a micro-operation when there is an overlap of that micro-operation with at least one other micro-operation in the same cycle. The MOE energy cost of a micro-operation is by definition independent of the other micro-operations which overlap with it in the same cycle. Calculations of the MIE value, the OE value and the MOE value are explained in detail in conjunction with FIG. 6. Further, the energy of the operation pipeline can be calculated using the energy per cycle of each cycle of the operation pipeline. Similarly, the energy of all the operation pipelines executed in the second IP block 106 are calculated and used to calculate the total energy consumption of the second IP block 106. Further, the power consumption of the second IP block 106 is calculated using the total energy consumption of the second IP block 106. The power consumption of the other IP blocks can be similarly calculated. At step 210, the power consumption of the second IP block 106 is determined using the energy per cycle for each cycle of the operation pipeline. Similarly, power consumption of one or more IP blocks in the IC design can be estimated. Further, by estimating the power consumption of the one or more IP blocks in the IC design, power consumption of the IC design can be calculated.

Figure 3:
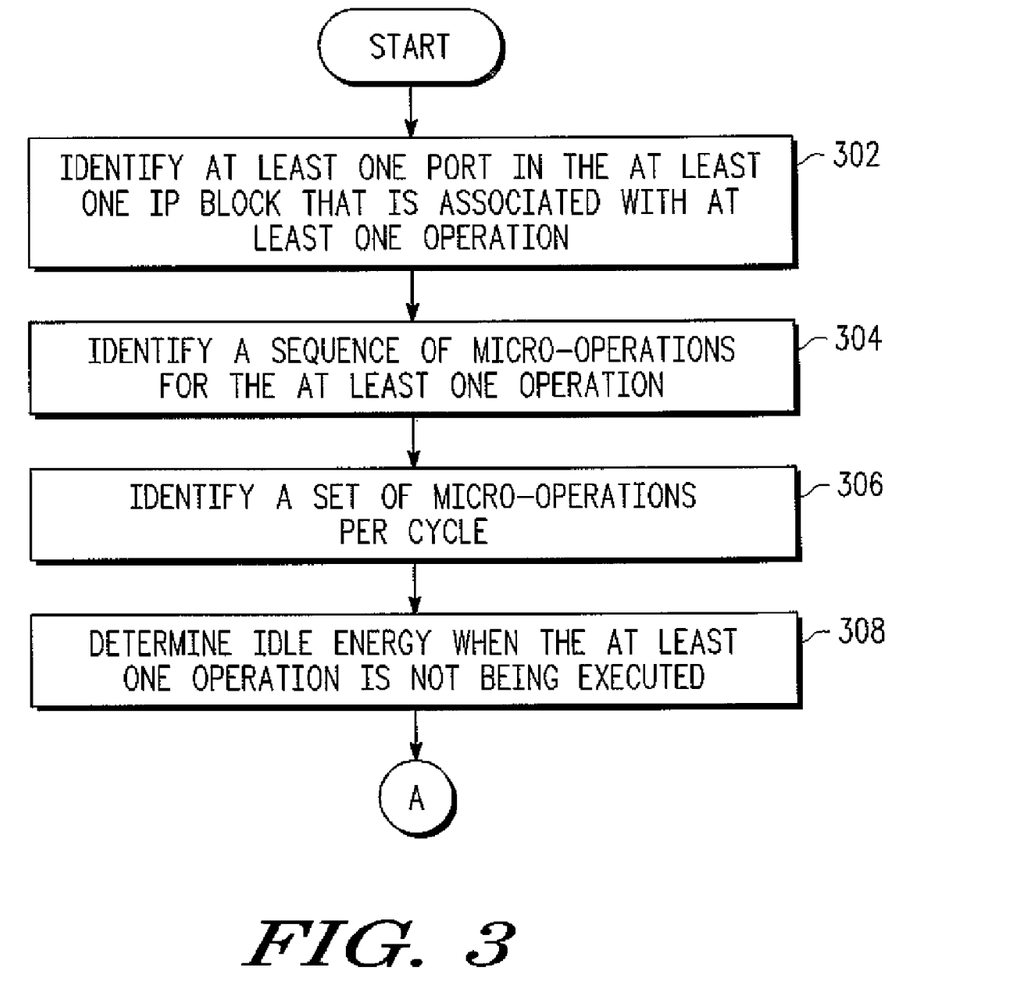
FIGS. 3 and 4 illustrate a flow diagram depicting a method for estimating the power consumption for at least one IP block in an IC design, in accordance with another embodiment of the present invention.
Figure 4:
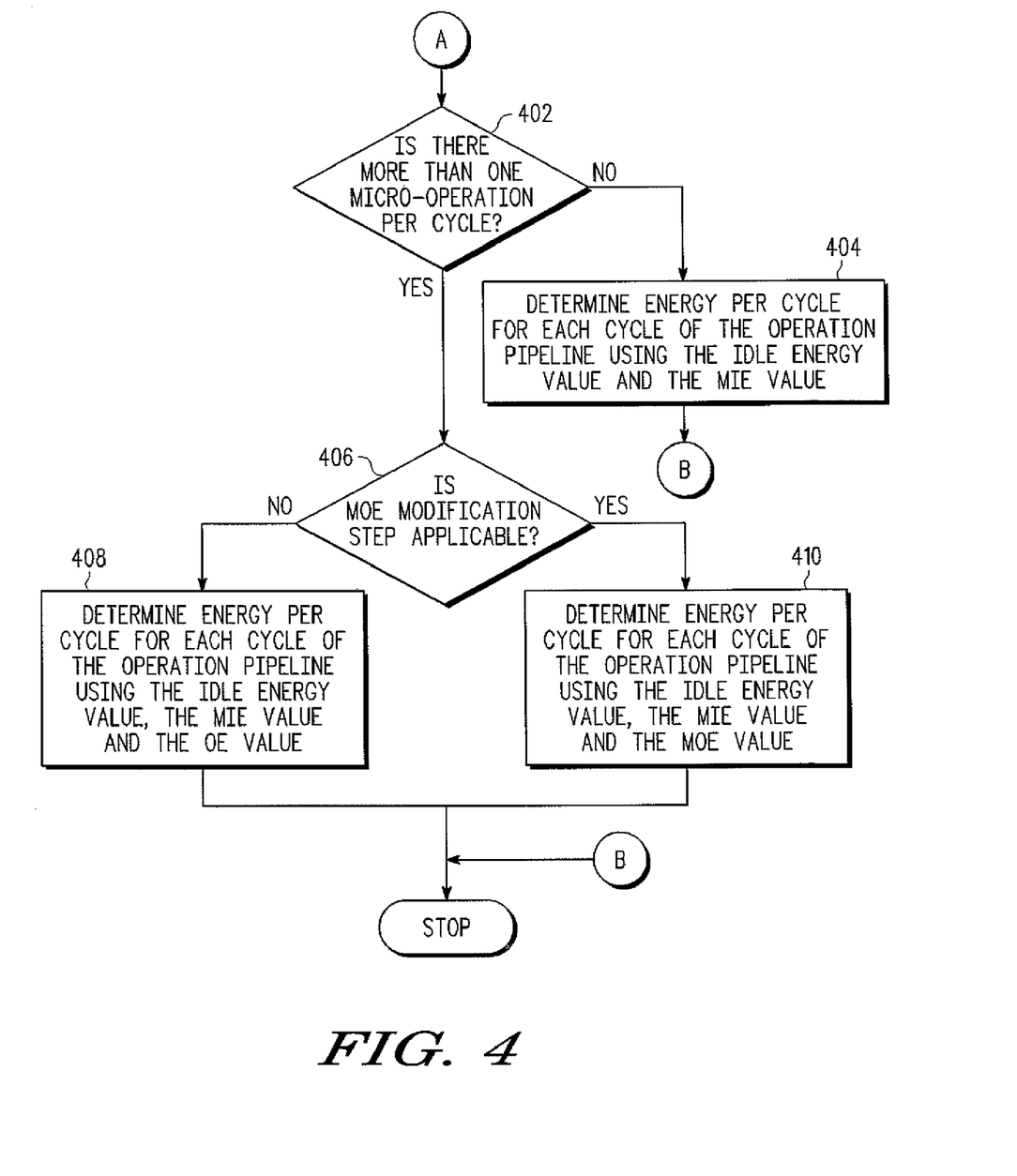

FIGS. 3 and 4 illustrate a flow diagram depicting a method for estimating the power consumption for at least one IP block in an IC design, in accordance with another embodiment of the present invention.

Referring now to FIG. 3, in one embodiment, the second IP block 106 is configured to process specific instructions. Input data is provided to the second IP block 106 through input ports, wherein the second IP block 106 executes the operations according to the data provided. The input data is provided through input ports. After executing the operations, the output is provided through output ports. In another embodiment, the same port can act as an input port and an output port. At step 302, at least one port in the second IP block 106 is identified, wherein the at least one port is associated with at least one operation. One or more ports of the second IP block 106 are capable of receiving and executing either a subset or all the operations of the second IP block 106. In one embodiment, energy per cycle is calculated for the at least one operation of the at least one port. At step 304, a sequence of micro-operations is identified for the at least one operation on the at least one port in the second IP block 106. In one embodiment, the sequence of micro-operations constitutes the at least one operation. Further, the sequence of micro-operations is executed in a pipeline. The identification of the sequence of micro-operations facilitates the process of identifying the overlap among the micro-operations of two or more operations in the same cycle.

At step 30G, a set of micro-operations executed in one cycle is identified. Different operations have a different sequence of micro-operations. The operations in the IC design are executed in parallel. This implies that the micro-operations of the operations that fall under the same cycle are executed first, after which the micro-operations in the next cycle are executed. In one embodiment, the second IP block 106 performs a cache controller operation. A cache controller operation of a read-hit access and a read-miss access includes a sequence of micro-operations. For a read-hit operation in a first cycle, a tag comparison check for a hit or miss in the cache is carried out and the speculative memory read is performed. A hit implies that a read operation is possible for a given cycle. A speculative read operation is executed before it is known when the read operation will occur and from what address will it occur. If there is a hit, it reduces the latency time taken to read data from the cache. In a second cycle, the memory read is completed and data is sent to the second IP block 106. In a third cycle, the cache usage state is updated, such as, for a least recently used (LRU) state. In one cycle, one micro-operation is executed. Similarly, for a read-miss operation in a first cycle, a tag-comparison check for a hit or a miss in the cache is carried out and the speculative memory read is performed. For this operation, the result is a miss. In a second cycle, a line to be replaced due to the resulting miss is identified and a new tag is set for it. In a third cycle, a cache usage state is updated, such as an LRU state, and the thrashing of dirty data is followed by the fetch request for the required data from a lower-level memory subsystem. From the fourth cycle to the kth cycle, a variable number of wait cycles are required for a requested data arrival, depending on the memory access time and system latency. In the k+1th cycle, the fetched data is sent out to the second IP block 106 and is also written into the cache. Similarly, other operations, along with their sequence of micro-operations, can be identified for any other IP block. Further, information on operations and their sequence of micro-operations for an IP block is available in technical reference manuals.

There is a difference in the nature of the pipeline between a programmable processor and a genetic peripheral IP Block. The pipeline of a programmable processor is generally of a regular nature and is identical for most of the instructions. Typically, a pipeline of a programmable processor can include stages such as fetch, decode, memory access, execute and write-back. Further, the micro-operation pipelines of the different operations of an IP block can have a varying pipeline depth and different micro-operations performed in them, as described in the case of the read hit/miss of a cache controller.

At step 308, the idle energy is determined when the at least one operation in the second IP block 106 is not being executed. The idle energy is referred to as $E_{idle}$. In one embodiment, the $E_{idle}$ constitutes the base energy of the second IP block 106, and typically includes the clock network power and the leakage power components of the second IP block 106. The idle energy value is used in further calculations. Idle energy is taken into account to enable accurate energy estimation of the second IP block 106. Apart from the idle energy, the MIE values, the MOE values and the OE values are needed to calculate the energy consumption of second IP block 106. The MIE value is the energy consumption of a single micro-operation of an operation pipeline, where the single micro-operation is being executed on a specific port. The OE value is the energy consumption of the set of micro-operations for different operations that are executed on multiple ports in the same cycle. The MOE value is the energy consumption of a micro-operation when there is an overlap of that micro-operation with at least one other micro-operation occurring in the same cycle. The MOE energy cost of a micro-operation is by definition independent of the other micro-operations which overlap with it in the same cycle. The calculation of the above mentioned energy values is explained in detailed in conjunction with FIG. 6.

Referring now to FIG. 4, at step 402, whether there is more than one micro-operation per cycle in the operation pipeline is checked. At step 404, the energy per cycle of the operation pipeline is determined using the idle energy value and the MIE values when there is only one micro-operation per cycle in the operation pipeline. The MIE value is the energy consumption of a single micro-operation of an operation pipeline, where the single micro-operation is executed on a specific port. The calculation of MIE values is explained in detail in conjunction with FIG. 6.

At step 406, it is determined whether the MOE reduction of the table size is applicable when there is more than one micro-operation per cycle in the operation pipeline. In one embodiment, the reduction of the table size is related to the reduction in the number of the OE values stored in one or more predefined tables. This reduction of the table size is based on the assumption that when at least more than one micro-operation occurs in a cycle, there is an overlap between the energy values by virtue of control or data path logic sharing. Further, in one embodiment, a suitable algorithm is applied, by which a fewer number of OE energy values are needed to be stored in the predefined table. Reducing the table sizes simplifies the calculation of the energy per cycle while maintaining a desired accuracy level. The calculation of the MIE values, the MOE values and the OE values is explained further in conjunction with FIG. 6.

In one embodiment, the reduction of the table size is based on the port independence and operation independence of one or more of the micro-operation isolated energy and the overlap energy of the set of micro-operations per cycle. The reduction of the table size helps in reducing the number of MIE and OE values that need to be stored and used to calculate the energy per cycle. The reduction of the MIE values is divided into two categories. The first category involves the reduction of the MIE values, based on the port independence of the micro-operation isolated energy. The reduction of the MIE values, based on the port independence of the micro-operation isolated energy involves verifying the hypothesis that for a given operation $O_k$, the micro-operation isolated energy of stage $S_{ki}$ is independent of the port $P_n$ that executes the operation, within an acceptable range of accuracy. This implies that the MIE values of the micro-operation occurring on any of the ports $P_{n1}$ or $P_{n2}$ is almost of an identical value and is independent of the port on which it is being executed. Consequently, any one of the MIE values can be stored in the first predefined table.

The second category involves the reduction of the MIE values, based on the operation independence of the micro-operation isolated energy. In one embodiment, two operations, $O_{k1}$ and $O_{k2}$, have different sequences of micro-operations, even if they have only a few micro-operations in common. For example, in the case of a specific cache controller implementation, both the read-hit operation and the read-miss operation can have a common micro-operation for performing tag comparison in the first cycle of the operations. The reduction of the MIE values, based on the operation independence of the micro-operation isolated energy, can include the testing of the hypothesis that the energy consumption of micro-operation '$M_i$' is independent of the operation for which the micro-operation $M_i$ occurs. This implies that the same micro-operation Mi occurs during different stages of operations $O_{k1}$ and $O_{k2}$, and hence, only a single value can be stored for the MIE value in the first predefined table. This reduction reduces the number of MIE values that need to be stored in the first predefined table.

Further, the reduction of the OE values is divided into two categories. In one embodiment, the first category can involve the reduction of the OE values, based on the port independence of the overlap energy. The reduction of the OE values based on the port independence of the overlap energy, verifies the hypothesis that the overlap energy of a set of overlapping micro-operations is independent of the ports on which these operations are executing, within an acceptable range of accuracy. This implies that the OE value for a set of micro-operations being executed from different ports in the circuit is almost of an identical value, and hence, any one value of the overlap energy can be stored in the third predefined table. This reduction reduces the number of OE values that needs to be stored in the third predefined table.

The second category involves the reduction of the OE values, based on the overlap vector independence of the micro-operation overlap energy. The reduction of the OE values, based on the overlap vector independence of micro-operation overlap energy, verifies the hypothesis that there is a micro-operation overlap energy for a given micro-operation that is independent of the overlapping micro-operation vector. The overlapping vector is a set of micro-operations that occur in the same cycle. This micro-operation overlap energy is stored in the second predefined table. This reduction reduces the number of OE values that need to be stored in the third predefined table.

Accordingly, if at step 406 it is determined that the MOE modification step is not applicable, then at step 408, the energy per cycle for each cycle of the operation pipeline is determined using the idle energy value, the MIE value and the OE value. However, if at step 406, it is determined that the MOE modification step is applicable, then at step 410, the energy per cycle for each cycle of the operation pipeline is determined using the idle energy value, the MIE value and the MOE value, when the MOE reduction step (the second OE reduction step mentioned above) is applicable.

Figure 5:
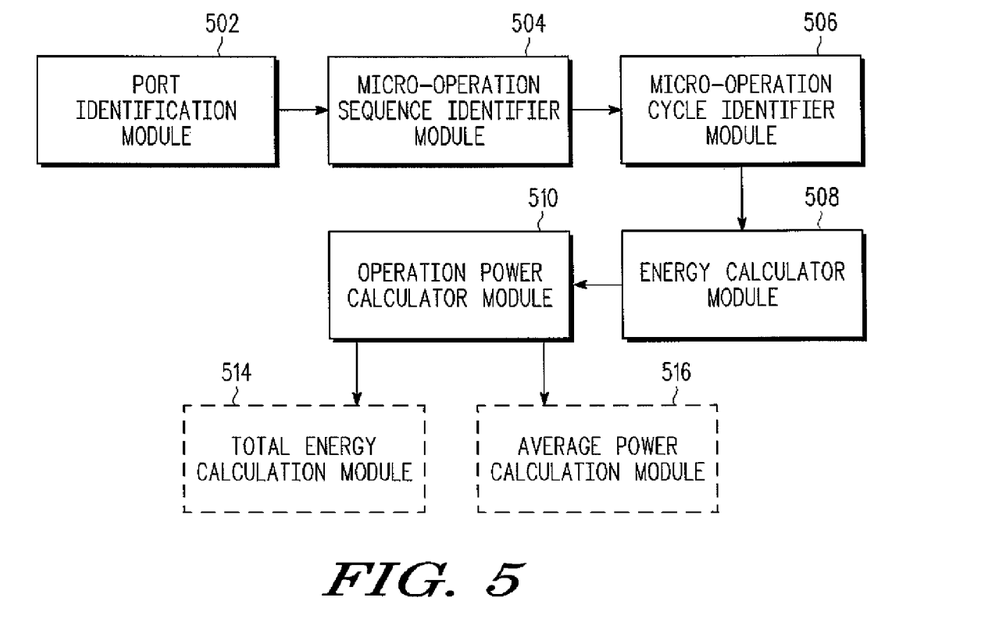
FIG. 5 is a schematic block diagram of a system for estimating the power consumption for at least one IP block in an IC design, in accordance with an embodiment of the present invention.

Referring now to FIG. 5, a schematic block diagram of a system for estimating the power consumption for at least one IP block in an IC design is shown, in accordance with an embodiment of the present invention. In one embodiment, the power consumption of the second IP block 106 is calculated. The second IP block 106 is configured to execute operations, based on the inputs provided to the second IP block 106 via the input ports. Similarly, after executing the operations, the output is obtained at output ports. In one embodiment, a single port acts as both an input port and an output port. The power consumption is calculated based on the transactions received at the ports. The system for estimating the power consumption includes a port identification module 502, a micro-operation sequence identifier module 504, a micro-operation cycle identifier module 506, an energy-calculator module 50S, and an operation power calculator module 510.

The port identification module 502 identifies at least one port in the second IP block 106, where the at least one port is associated with at least one operation. The second IP block 106 includes a set of ports 'P', where the ports can be denoted as $\{P_1, P_2, \ldots, P_n, \ldots, P_N\}$. Each port $P_n$ of the set 'P' can include a group of control and data signals, as required by the operations the port is designed to support. The micro-operation sequence identifier module 504, in communication with the port identification module 502, identifies a sequence of micro-operations for the at least one operation, wherein the sequence of micro-operations constitutes an operation pipeline.

The micro-operation cycle identifier module 506, in communication with the micro-operation sequence identifier module 504, identifies the set of micro-operations per cycle in the operation pipeline. The set of micro-operations per cycle is identified to accurately estimate the energy consumption of the second IP block 106. The energy-calculator module 508, in communication with the micro-operation cycle identifier module 506, determines energy per cycle of each cycle of the operation pipeline. The energy per cycle is based on the set of micro-operations per cycle, using one or more of, an idle energy value, an MIE value, an OE value, and an MOE value. The idle energy value is the base energy consumption of the second IP block 106, and typically includes the clock network power and leakage power components of the second IP block 106. The MIE value is the energy consumption of a single micro-operation of an operation pipeline, where the single micro-operation is executed on a specific port. The OE value is the energy consumption of the set of micro-operations for different operations that are executed on multiple ports in the same cycle. The MOE value is the energy consumption of a micro-operation when there is an overlap of that micro-operation with at least one other micro-operation in the same cycle. The MOE energy cost of a micro-operation is by definition independent of the other micro-operations which overlap with it in the same cycle.

In one embodiment, the MIE values, the MOE values and the OE values are stored in respective first, second and third predefined tables. Further, the first, second and third predefined tables can be included in a characterizing module. The characterizing module provides the first, second and third predefined tables as inputs to the energy calculator module 508. The characterizing module is explained in detail in conjunction with FIG. 6. The operation power calculator module 510, in communication with the energy-calculator module 508, determines the power consumption of the operation pipeline using the energy per cycle of each cycle of the operation pipeline. The operation power is used to determine the average power of the second IP block 106. The operation power of the other IP Blocks is calculated in a similar manner.

The operational power of the IC design is calculated by combining the operational power of the second IP block 106 and the other IP blocks.

The power consumption estimation system can also include a total energy calculation module 514. The total energy calculation module 514 determines the total energy consumption of the second IP block 106 using the energy consumption of one or more operation pipelines. In one embodiment, the total energy-calculation module 514 uses the operation power calculated for the second IP block 106. The power consumption estimation system can also include an average power calculation module 516 that determines the average power consumption of the second IP block 106 using the total energy consumption of the second IP block 106. The power consumption of the other IP blocks is calculated in a similar manner. The power consumption of the IC design is calculated by combining the power consumption of all of the IP blocks.

Figure 6:
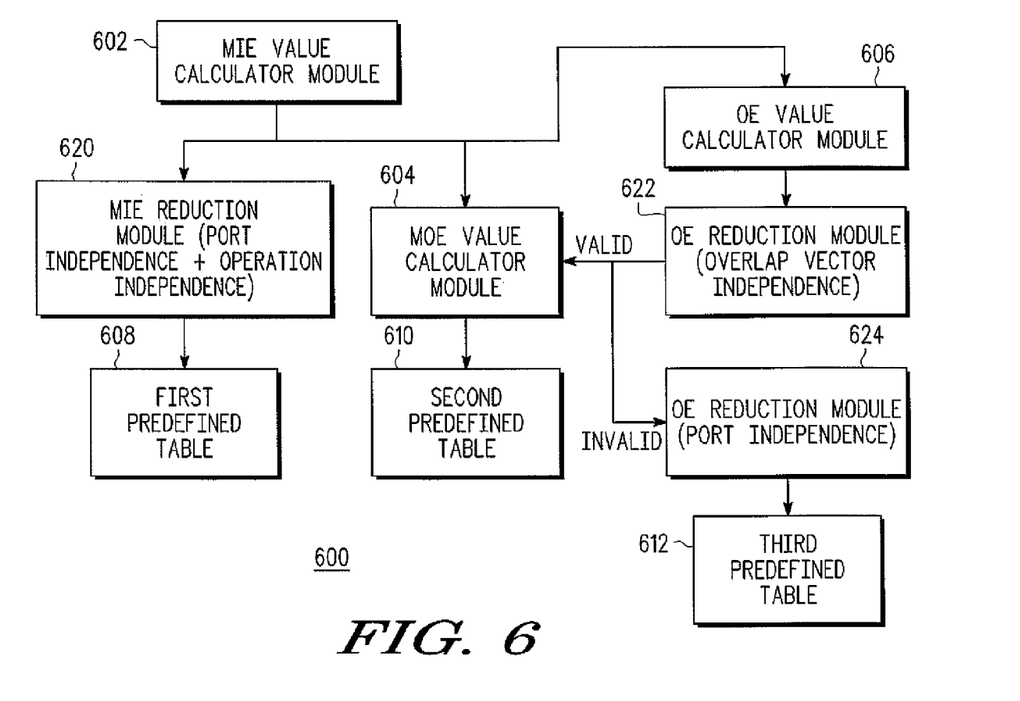
FIG. 6 is a schematic block diagram of a characterizing module, in accordance with an embodiment of the present invention.

FIG. 6 is a schematic block diagram of a characterizing module 600, in accordance with an embodiment of the present invention. The characterizing module 600 includes a MIE value calculator module 602, a MOE value calculator module 604, and an OE calculator module 606. The characterizing module 600 may also include first, second and third predefined tables 608, 610 and 612, respectively. However, it will be understood by those of skill in the art that the predefined tables 608, 610 and 612 may comprise registers or a local memory formed in the characterizing module 600 or that the predefined tables 608, 610 and 612 may be defined in an external memory coupled to the energy calculator module 508, in which case the tables 608, 610 and 612 would provide inputs to the energy calculator module 508. In one embodiment, the characterizing module 600 stores the MIE values, the MOE values and the OE values in the first, second and third predefined tables 608, 610 and 612, respectively. In one embodiment of the invention, the characterizing module 600 also includes a MIE reduction module 620, a first OE reduction module 622 for overlap vector independence and a second OE reduction module 624 for port independence.

The MIE values, the MOE values and the OE values are required for the calculation of the energy consumption of the second IP block 106. A set of ports 'P', present in the second IP block 106, can be denoted as $\{P_1, P_2, \ldots, P_n, \ldots, P_N\}$. Each port $P_n$ of the set 'P' can include a group of control and data signals, as required by the operations the port is designed to support. In one embodiment, the power consumption of the second IP block 106 is calculated based on the operations executed at the ports. The second IP block 106 can perform a set of operations 'O', where the operations are denoted as $\{O_1, O_2, \ldots, O_k, \ldots, O_K\}$, where each operation $O_k$ of the set 'O' includes a sequence of micro-operations. The sequence of micro-operations is executed in the successive cycles of an operation pipeline. The sequence of micro-operations forms the operation pipeline with stages '$S_k$', where the stages are denoted as $\{S_{k1}, S_{k2}, \ldots, S_{k3} \ldots S_{ki}\}$. Stage '$S_{ki}$' of the set $S_k$ executes in the ith cycle that is relative to the start of operation $O_k$. In one embodiment, '$W_{k,i,n}$' can represent the occurrence of micro-operation stage $S_{ki}$ of an operation $O_k$, when the operation $O_k$ is executed from port $P_n$. A 'T-length' set of micro-operations $W_{k,i,n}$ that occur on a given cycle in the second IP block 106 can be denoted as '$V_{Tm}$' A group of all such possible T-length sets '$V_T$' can be denoted as $\{V_{T1}, V_{T2}, \ldots, V_{Tm}, \ldots, V_{TN}\}$, where $V_{Tm}=[W_{k1,i1,n1}, W_{k2,i2,n2}, \ldots, W_{kl,il,nl}, \ldots, W_{kT,iT,nT}]$, where $O_{k1} \in O$, $S_{ki1} \in S_k$, $P_{n1} \in P$. The complete set of all the possible length event micro-operations sets 'V' is denoted as $\{V_1, V_2, \ldots, V_T, \ldots, V_L\}$.

Further, all the possible sets of overlaps of the set of micro-operations $W_{k,i,n}$ of the second IP block 106 can be included in the set 'V'.

The single length overlap vector $V_{lm}$ can represent the occurrence of the isolated micro-operation $\{W_{k,i,n}\}$. This is required to calculate the micro-operation isolated energy (MIE) '$E_{v1m\_MIE}$' of all the possible single-length overlap vectors $V_{1m}$ of all the $O_k \in O$, $S_{ki} \in S_k$, $P_n \in P$. The isolated energy consumption of each micro-operation $W_{k,i,n}$ denoted as $E_{v1m\_MIE}$ is calculated by applying functional vectors which execute a single operation $O_k$ on a specific port $P_n$ in isolation, where isolation implies that prior to and after the selected operation execution on the selected port, the circuit is in idle state and that during the execution of operation $O_k$, there is no other operation executing on the circuit. $E_{v1m\_MIE}$ represents the energy consumption of the micro-operation set $V_{1m}$ that exceeds the base idle energy consumption of the IP block. The idle energy consumption of the IP block can be denoted as $E_{idle}$. In one embodiment, the micro-operation isolated energy, when a micro-operation of stage $S_{ki}$ of operation $O_k$ occurs when operation $O_k$ is being executed from port $P_n$, is given as:

$$E_{V1m\_MIE} = E_{V1m} - E_{idle} \quad (1)$$

In the equation (1), $E_{V1m}$ represents the measured energy consumption of stage $S_{ki}$ of operation $O_k$ that is executing from port $P_n$. In one embodiment, the calculation of $E_{V1m\_MIE}$ can be based on different data toggling under different functional scenarios. For example, when $W_{k,i,n}$ corresponds to a micro-operation stage comprising data read from a memory and driven on a data bus in a memory controller circuit, the variation in isolated energy consumption can be taken into account, depending on the number of data bits and address bits toggling.

In one embodiment, the MIE value calculator module 602 in conjunction with MIE reduction module 620 creates the data stored in the first predefined table 608. The MIE value calculator module 602 calculates the MIE value using the equation (1) for each micro-operation $W_{k,i,n}$, where $W_{k,i,n}$ represents micro-operation stage $S_{ki}$ of operation $O_k$, when operation $O_k$, is executed from port $P_n$. The MIE reduction module 620 checks for both port and operation independence reduction steps. The calculated MIE values are stored in the first predefined table 608 and are used to determine the energy per cycle.

The MOE value calculator module 604, in communication with the MIE value calculator module 602, calculates the MOE value. The micro-operation overlap energy represents the overlap energy consumption of this micro-operation with other micro-operations. To calculate the MOE value of a micro-operation $W_{k1,i1,n1}$ a functional vector that causes occurrence of two micro-operation $W_{k1,i1,n1}$ and $W_{k2,i2,n2}$ is applied, and the MOE value can be determined using the MIE values of the micro-operations $W_{k1,i1,n1}$ and $W_{k2,i2,n2}$. The MOE value of the micro-operation $W_{k1,i1,n1}$, can be given as:

$$E_{v1m1\_MOE} = E_{idle} + E_{v1m2\_MIE} + E_{v1m1\_MIE} - E_j \quad (2)$$

In the equation (2), $E_{V1m1\_MIE}$ and $E_{v1m2\_MIE}$ represent the MIE values of the micro-operations $W_{k1,i1,n1}$ and $W_{k2,i2,n2}$, respectively. Further, $E_j$ represents the measured energy consumption of the cycle 'j' in which these two micro-operations overlap. Equation (2) assumes that $E_{v1m2\_MIE}$ is greater than or equal to $E_{v1m1\_MIE}$. This requirement comes because the MOE formulation is based on the premise that that when multiple micro-operations overlap in a given cycle, the effective energy contribution of a micro-operation is its (MIE-MOE) value, except for the micro-operation with the largest value of MIE. The MOE values of the different micro-operation events can be calculated by the MOE value calculator module 604. In one embodiment, the calculated MOE values are stored in the second predefined table 610.

The OE value calculator module 606; in communication with the MIE value calculator module 602, and in conjunction with the first OE Reduction Module 622 (OE overlap vector independence) checks for applicability of overlap-vector independence reduction step; and if found, then invokes the MOE value calculator module 604 to add the MOE energy value for the specific micro-operation to the data stored in the second predefined table 610. If applicability of the overlap-vector independence reduction step is found to be not true, then the OE value calculator module 606 in conjunction with the second OE Reduction Module 624 (port independence reduction module) adds the OE energy value for the specific overlap-vector to data stored in the third predefined table 612.

The overlap energy is calculated when a set of micro-operations of different operations are executed on multiple ports in the same cycle. The set of T overlapping micro-operations $\{W_{k1,i1,n1}, W_{k2,i2,n2}, \ldots, W_{kT,iT,nT}\}$ can be denoted as $V_{Tm}$. The overlap energy can be calculated for all possible 'T'-length micro-operation sets by using the MIE values, where $E_{V11\_MIE}, E_{V12\_MIE}, \ldots, E_{V1T\_MIE}$ are the MIE energies of micro-operations comprising $V_{Tm}$. For one embodiment, the overlap energy of an event set $V_{Tm}$ can be given as:

$$E_{VTm\_OE} = E_{idle} + (E_{V11\_MIE} + E_{V12\_MIE} + \ldots + E_{V1T\_MIE}) - E_{VTm} \quad (3)$$

In the equation (3), $E_{VTm}$ represents the measured energy consumption of the overlap cycle. Further, for one embodiment, the overlap energy can be a positive quantity, a negative quantity or zero. During the execution of a set of micro-operations in a cycle, when some portion of the control or data path logic is shared by multiple micro-operations, that portion would be counted multiple times while adding the MIE of the micro-operations in the set of micro-operations. This would result in the overlap energy being a positive quantity. However, when the overlap of multiple micro-operations causes extra controller or data path toggling, the overlap energy would be a negative quantity. Further, if there is no dependence between the control and data paths between the overlapping micro-operations, the overlap energy would be zero.

As explained above, the characterizing module 600 calculates the MIE, MOE and OE values, and stores them in the first, second and third predefined tables 608, 610 and 612, respectively. These energy values are used to estimate the power consumption of the IP block. Characterization including the reduction steps is a one-time activity leading to the creation of the first, second and third predefined tables 608, 610 and 612. Subsequently, power estimation may be carried out on any number of activity profiles (i.e., operation sequences) using the previously created predefined tables 608, 610 and 612.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for estimating power consumption for at least one Intellectual Property (IP) block in an integrated circuit (IC) design, the method comprising:

identifying at least one port in the at least one IP block, wherein the at least one port is associated with at least one operation;

identifying a sequence of micro-operations of the at least one operation, wherein the sequence of micro-operations constitute an operation pipeline;

identifying a set of micro-operations per cycle of the operation pipeline;

determining an energy per cycle for each cycle of the operation pipeline based on the set of micro-operations per cycle using one or more of an idle energy value, a micro-operation isolated energy (MIE) value, an overlap energy (OE) value, and a micro-operation overlap energy (MOE) value; and determining power consumption of the at least one IP block using the energy per cycle for each cycle of the operation pipeline.

2. The power consumption estimation method of claim 1, wherein the idle energy value is determined based on energy consumption in the at least one IP block when the at least one operation is not being executed.

3. The power consumption estimation method of claim 1, further comprising determining the energy per cycle for each cycle of the operation pipeline using the MIE value and the idle energy value when one micro-operation from the set of micro-operations is being executed per cycle.

4. The power consumption estimation method of claim 1, wherein the MIE value is determined using a first predefined table.

5. The power consumption estimation method of claim 4, wherein the MIE value of a micro-operation is based on a measured energy consumption value of the micro-operation and the idle energy value, and wherein the MIE value is stored in the first predefined table.

6. The power consumption estimation method of claim 4, wherein the MOE value is determined using a second predefined table.

7. The power consumption estimation method of claim 6, wherein the MOE value is based on a measured energy consumption value, the idle energy value and the MIE value when at least two micro-operations from the set of micro-operations are being executed per cycle, and wherein the MOE value is stored in the second predefined table.

8. The power consumption estimation method of claim 6, wherein the OE value is determined using a third predefined table.

9. The power consumption estimation method of claim 8, wherein the OE value is based on a measured energy consumption value, the idle energy value and the MIE value when at least two micro-operations from the set of micro-operations are being executed per cycle, and wherein the OE value is stored in the third predefined table.

10. The power consumption estimation method of claim 8, further comprising reducing the sizes of the first, second and third tables based on port independence and operation independence of one or more of micro-operation isolated energy and overlap energy of the set of micro-operations per cycle.

11. The power consumption estimation method of claim 10, further comprising determining the energy per cycle for each cycle of the operation pipeline using the MIE value, the MOE value and the idle energy value when at least one or more micro-operations from the set of micro-operations are being executed per cycle and when MOE reduction to determine the energy per cycle for each cycle of the operation pipeline is applicable to the set of micro-operations per cycle.

12. The power consumption estimation method of claim 10, further comprising determining the energy per cycle for each cycle of the operation pipeline using the MIE value, the OE value and the idle energy value when at least two micro-operations from the set of micro-operations are being executed per cycle and when MOE reduction to determine the energy per cycle for each cycle of the operation pipeline is not applicable to the set of micro-operations per cycle.

13. The power consumption estimation method of claim 1, further comprising the step of determining total energy consumption in the at least one IP block using energy consumption of one or more operation pipelines.

14. The power consumption estimation method of claim 13, further comprising the step of determining average power consumption in the at least one IP block using the total energy consumption in the at least one IP block.

15. A system for estimating power consumption for at least one Intellectual Property (IP) block in an integrated circuit (IC) design, the system comprising:
- a port identification module that identifies at least one port in the at least one IP block, wherein the at least one port is associated with at least one operation;
- a micro-operation sequence identifier module in communication with the port identification module that identifies a sequence of micro-operations of the at least one operation, wherein the sequence of micro-operations constitutes an operation pipeline;
- a micro-operation cycle identifier module in communication with the micro-operation sequence identifier module that identifies a set of micro-operations per cycle in the operation pipeline;
- an energy-calculator module in communication with the micro-operation cycle identifier module that determines an energy per cycle for each cycle of the operation pipeline based on the set of micro-operations per cycle using one or more of an idle energy value, a micro-operation isolated energy (MIE) value, an overlap energy value (OE), and a micro-operation overlap energy (MOE) value; and
- an operation power calculator module in communication with the energy-calculator module that determines power consumption of the operation pipeline using the energy per cycle for each cycle of the operation pipeline.

16. The power consumption estimation system of claim 15, wherein the MIE value is stored in a first predefined table, the MOE value is stored in a second predefined table, and the OE value is stored in a third predefined table.

17. The power consumption estimation system of claim 16, wherein the energy-calculator module further comprises a characterizing module, wherein the characterizing module comprises:
- an MIE value calculator module that calculates the MIE value and stores the MIE value in the first predefined table, wherein the MIE value is based on a measured energy consumption value and the idle energy value when one micro-operation from the set of micro-operations is being executed per cycle;
- an MOE value calculator module in communication with the MIE value calculator module that calculates the MOE value and stores the MOE value in the second predefined table, wherein the MOE value is based on a measured energy consumption value, the idle energy value and the MIE value when at least two micro-operations from the set of micro-operations are being executed per cycle; and
- an OE value calculator module in communication with the MIE value calculator module that calculates the OE value and stores the OE value in the third predefined table, wherein the OE value is based on a measured energy consumption value, the idle energy value and the MIE value when at least two micro-operations from the set of micro-operations are being executed per cycle.

18. The power consumption estimation system of claim 15, further comprising a reduction module that reduces the MIE, MOE, and OE table sizes based on port independence and operation independence of one or more of micro-operation isolated energy and overlap energy of the set of micro-operations per cycle.

19. The power consumption estimation system of claim 15, further comprising:
- a total energy-calculator module that determines total energy consumption in the at least one IP block using energy consumption of one or more operation pipelines; and
- an average power calculator module that determines average power consumption in the at least one IP block using the total energy consumption in the at least one IP block.

20. A computer program product, stored in a tangible computer readable medium, for estimating power consumption for at least one Intellectual Property (IP) block in an integrated circuit(IC) design, the computer program product comprising:
- a first set of instructions for identifying at least one port in the at least one IP block, wherein the at least one port is associated with at least one operation;
- a second set of instructions for identifying a sequence of micro-operations for the at least one operation, wherein the sequence of micro-operations constitute the operation pipeline;
- a third set of instructions for identifying a set of micro-operations per cycle in the operation pipeline;
- a fourth set of instructions for determining an energy per cycle for each cycle of the operation pipeline based on the set of micro-operations per cycle using one or more of an idle energy value, a micro-operation isolated energy(MIE) value, an overlap energy value(OE), and a micro-operation overlap energy (MOE) value; and
- a fifth set of instructions for determining power consumption of the at least one IP block using the energy per cycle for each cycle of the operation pipeline.

* * * * *